Oct. 23, 1962
H. LINDEMANN
3,059,794
METHOD AND APPARATUS FOR CONVEYING ELONGATED
MATERIALS AND ARTICLES
Filed June 26, 1958
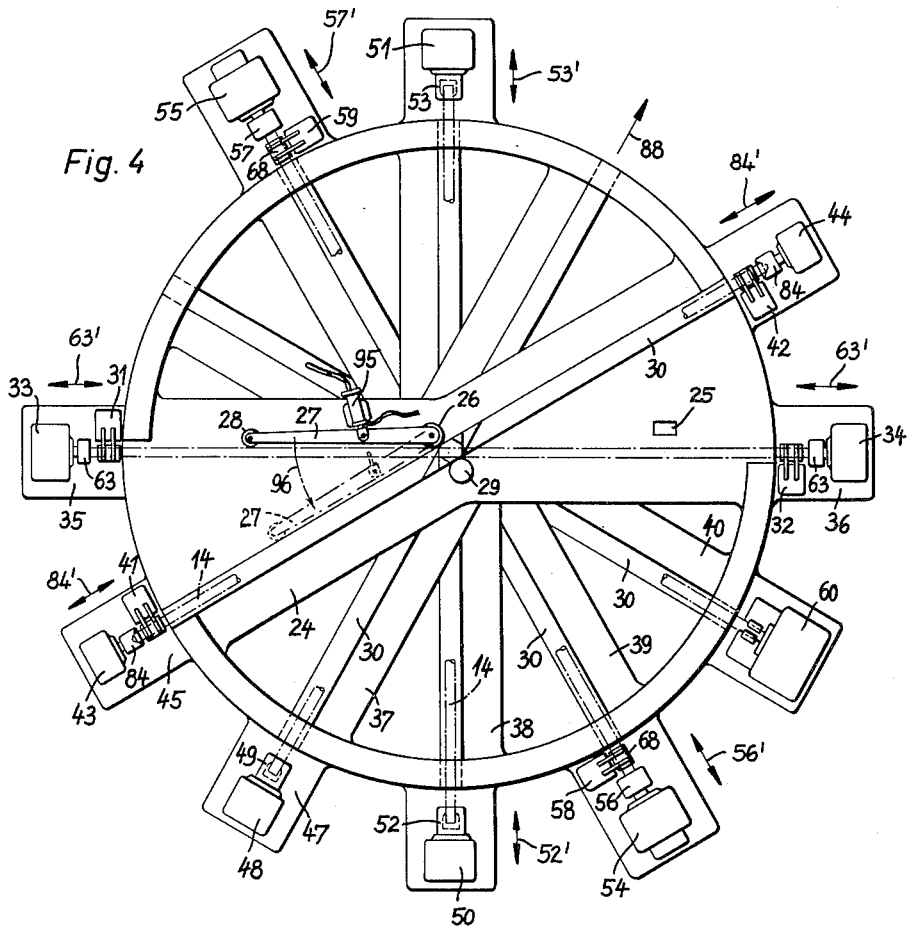
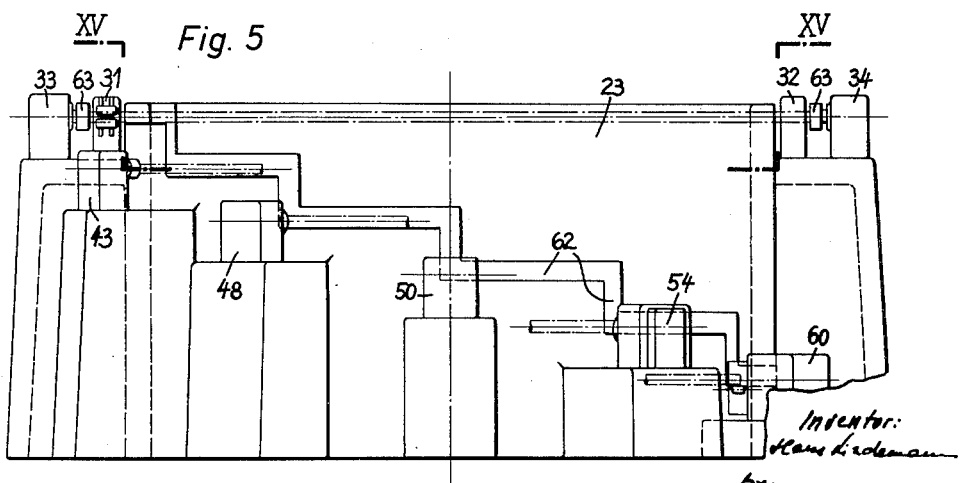

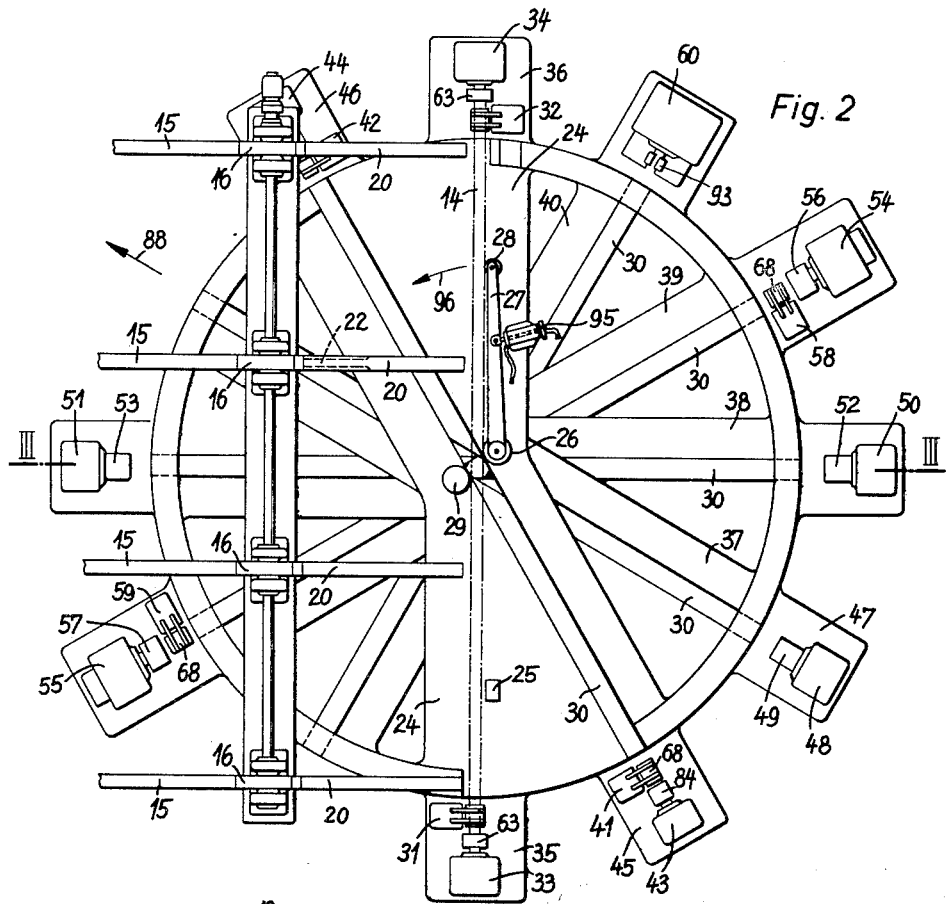
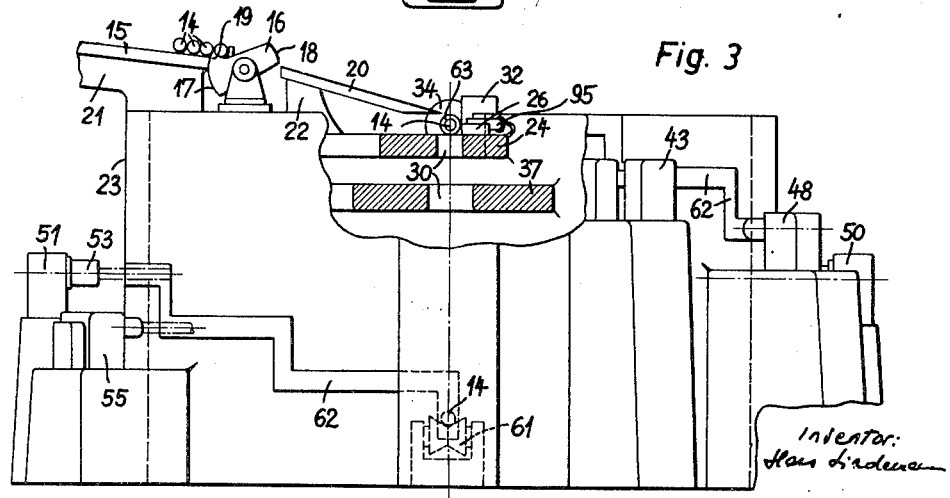

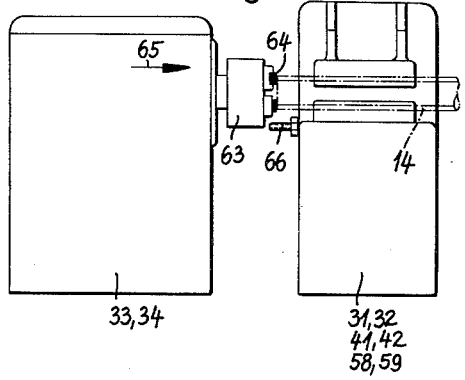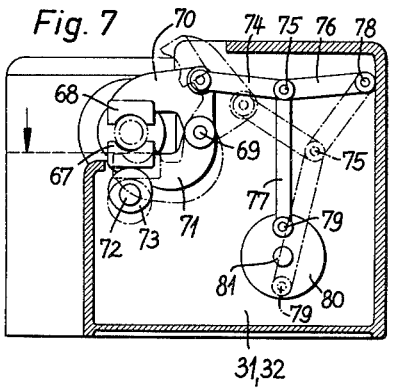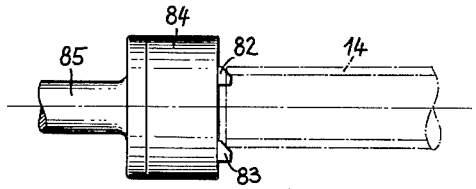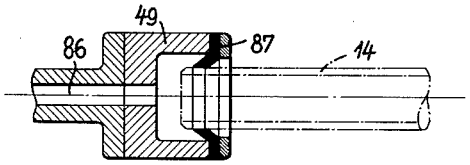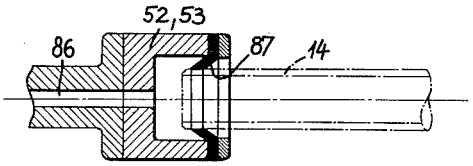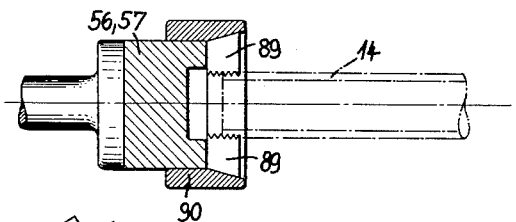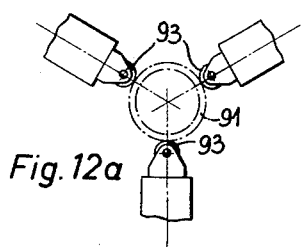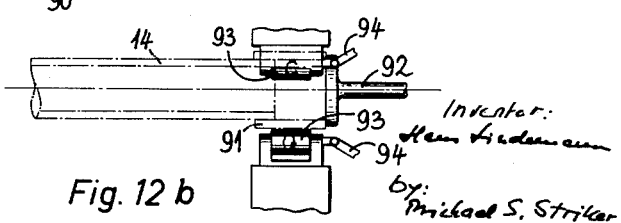

Oct. 23, 1962 H. LINDEMANN 3,059,794
METHOD AND APPARATUS FOR CONVEYING ELONGATED
MATERIALS AND ARTICLES
Filed June 26, 1958 6 Sheets-Sheet 5

Inventor:
Hans Lindemann
by:
Michael S. Striker

Oct. 23, 1962     H. LINDEMANN     3,059,794
METHOD AND APPARATUS FOR CONVEYING ELONGATED
MATERIALS AND ARTICLES
Filed June 26, 1958

United States Patent Office 3,059,794
Patented Oct. 23, 1962

3,059,794
METHOD AND APPARATUS FOR CONVEYING ELONGATED MATERIALS AND ARTICLES
Hans Lindemann, Bielefeld, Germany, assignor to Th. Calow & Co., Maschinenfabrik und Eisengiesserei, Bielefeld, Germany
Filed June 26, 1958, Ser. No. 744,792
Claims priority, application Germany June 26, 1957
7 Claims. (Cl. 214—152)

The present invention relates to a method and apparatus for conveying elongated materials and articles, and particularly rod-shaped materials such as pipes, from one point to another for certain work to be carried out especially on the end portions of such materials or articles at each point.

Rod-shaped materials and particularly pipes coming from a rolling mill or a welding apparatus or the like usually require certain work thereon before they can be of any practical use. For example, the pipes must be straightened, their ends must be cut off so as to be even and must be burred or chambered; the pipes must be tested to determine whether their seams are tight and whether they can withstand a required pressure; their ends must be threaded and possibly be provided with pipe sockets so as to be connected to each other, for example, for laying a water, gas, or oil pipe line. All of these and numerous other operations require a series of different machine tools. If these machines are mounted behind each other in the direction of the longitudinal axis of the pipes or rods to be worked on, the work or transfer line will be of a considerable length requiring special conveyers for transporting the pipes in longitudinal and transverse directions from one machine to the other. If the work or transfer line extends transverse to the longitudinal axis of the pipes, it is likewise necessary to provide both longitudinal and transverse conveyers. Although in this case the road will be shorter than in the first case, and its length will depend primarily upon the width of the various machine tools, the actual space required will hardly be smaller if the machines are to remain easily accessible. In order to reduce these large space requirements, it has been proposed to mount the pipes on a drum and so as to extend in a direction parallel to the rotary axis thereof, and to mount the different machine tools at different levels. Obviously, the greater the number of pipes which are to be mounted on such a drum and the greater the number of machine tools and work stations, the greater must be the diameter of the drum. If the required space is to be made as small as possible, the machine tools must be arranged very closely to each other and will then be rather inaccessible similarly as when the transfer line extends transversely of the pipes as previously described. Although the pipes could possibly also be mounted on a circular conveyer, for example, a large turntable of a diameter which is more than twice as large as the length of the individual pipes, they could then only be worked on at one end and would thereafter have to be conveyed to a similar turntable where the other ends of the pipes could be worked on by the respective machines provided around this turntable. Consequently, two turntables, each with its own set of machine tools would then be required. Although it might be possible to provide special conveying means for shifting the pipes longitudinally on the same turntable so as to permit first one end and thereafter also the other end of each pipe to be worked on, this would require a very complicated arrangement and would also have the disadvantage that the unfinished pipes cannot be supplied continuously thereto.

It is one of the objects of the present invention to provide a new method and apparatus for conveying a continuous series of elongated pieces of material or other articles in a continuous operation and in an intermittent motion from one to another of a large number of work stations.

It is a further object of the present invention to provide such a method and apparatus which permits such conveying operation to be carried out and such work stations to be located within a relatively small space. Consequently, the present invention lends itself to a multitude of applications, for example, as an automatic conveyer for an assembly line in which a large number of different operations are carried out successively either manually or by machines on a large series of products.

More specifically, it is another object of the present invention to provide such a new method and apparatus for successively conveying rod-shaped material, and particularly pipes, from one to another of almost any desired number of work stations where different manual or automatic operations may be carried out on such materials, and especially on one or both ends thereof.

A further object of the present invention is to provide such a new method which may be carried out within a much more confined space than possible with similar conveying methods previously known, and also to provide the necessary apparatus for carrying out such a method, which itself requires a relatively small space and which also permits a very large number of work stations or machine tools or other machines which are designed to perform certain work on the respective materials to be confined within a very small space.

Another object of the present invention is to provide a method and apparatus of the type described which permit a large number of machine tools or other machines required for carrying out a large number of different operations on a continuous succession of rod-shaped elements and particularly pipes to be combined into a single compound machine of a relatively small size.

These and other objects of the invention may be attained by turning the workpieces while traveling from one to another of their various work stations about a transverse axis which extends vertically to the longitudinal axis of the workpieces, and by conveying them in the direction of such transverse axis so that the end portions of these workpieces will each travel along a helical line, at various points of which the different work stations and the respective tools, machine tools, or other machines for working upon the workpieces are located. The conveying means as such essentially consist of a number of superimposed disks or the like of a diameter which is preferably adapted to the length of the workpieces. These conveying disks are further provided with gripping and guiding means in the form of slots or the like which also permit the workpieces, after being worked on at one station, to pass to the next disk. The width of these guiding slots may be variable and in accordance with the thickness or diameter of the workpieces. As already indicated, the work stations, tools, or machine tools are disposed within a helically staggered arrangement relative to each other around the conveying disks. The different machining and other operations on the workpieces may be distributed so that the steps of conveying or feeding and of working on the workpieces, for example, pipes, may proceed in a manner known as such in assembly lines.

For its successful performance, the new conveying method preferably relies upon the weight of the materials or other articles to be worked on. The articles are therefore preferably fed by their own gravity in a downward direction to the different machine tools or work stations. If, for example, a pipe which is supported by one of the disks or the like has been milled off at both ends so as to have perfectly plane end surfaces extending vertically to the pipe axis, the pipe is fed to a second disk which is disposed underneath the first disk, and which is then turned about a certain angle and holds the pipe in a position in which its two ends may be chamfered. After this operation has also been completed, the pipe will, by an actuation of suitable control means, be fed to a third disk or the like which is likewise turned about a certain angle and thus moves the pipe to a position in which its ends may be provided with caps which seal these ends tightly so that the pipe may thereafter be tested by hydraulic pressure.

Since such a hydraulic pressure test usually requires a greater length of time than the other operations, the pipe with the end caps thereon may during such time be fed successively to two, three or even more conveying disks until, at the completion of the hydraulic pressure test, it may then be subjected to the next machining or other operation. If the hydraulic pressure test has shown that the pipe has no defect, the necessary screw threads may then be cut upon one pipe end or upon both ends simultaneously, whereupon at the next work station each pipe is provided in the usual manner with only one pipe socket.

The longer the rod-shaped articles, for example, pipes, are which are to be worked on, the more work stations and machine tools may be provided about the periphery of the substantially cylindrical conveyor since, in accordance with the new conveying method, these machines will then be located, not only at different levels, but also at different angles of a circle which extends coaxially to and around the conveyor, and preferably at a uniform distribution along the periphery of such circle. Consequently, the space required for the entire conveyor including the work stations and machine tools will be of a substantially circular shape and of a diameter which will only be slightly larger than the length of the pipes or other articles to be worked on.

Further objects, features, and advantages of the present invention will be apparent from the following detailed description thereof, particularly when read with reference to the accompanying drawings, in which—

FIGURE 2 shows a plan view of a conveyor according to the invention which forms a compound machine by being equipped with a plurality of different machines and machine tools and a feeding mechanism for supplying pipes at regular intervals to the conveyor and for passing them away from the conveyor after all the work has been carried out thereon;

FIGURE 3 shows a side view of the compound machine as illustrated in FIGURE 2, partly in a cross section taken along line III—III of FIGURE 2;

FIGURE 4 shows a plan view of the compound machine as illustrated in FIGURE 2, but without the feeding mechanism for supplying the pipes to the conveyor;

FIGURE 5 shows a side view of the apparatus as shown in FIGURE 4;

FIGURE 6 shows a side view of a milling and clamping mechanism for working on one pipe end;

FIGURE 7 shows a side view, partly in section, of the mechanism according to FIGURE 6;

FIGURE 8 shows a side view of a tool which is used for chamfering one pipe end;

FIGURE 9 shows a cross section of a sealing fixture which is adapted to be connected to the partly finished pipes for flushing them so as to remove chips and other loose matter therefrom;

FIGURE 10 shows a fixture similar to that shown in FIGURE 9 for sealing one pipe end during the hydraulic pressure test;

FIGURE 11 shows a cross section of a threading die;

FIGURE 12a shows a front view of a pipe-socket mounting fixture of a type known as such;

FIGURE 12b shows a side view of the fixture shown in FIGURE 12a;

Figure 15:
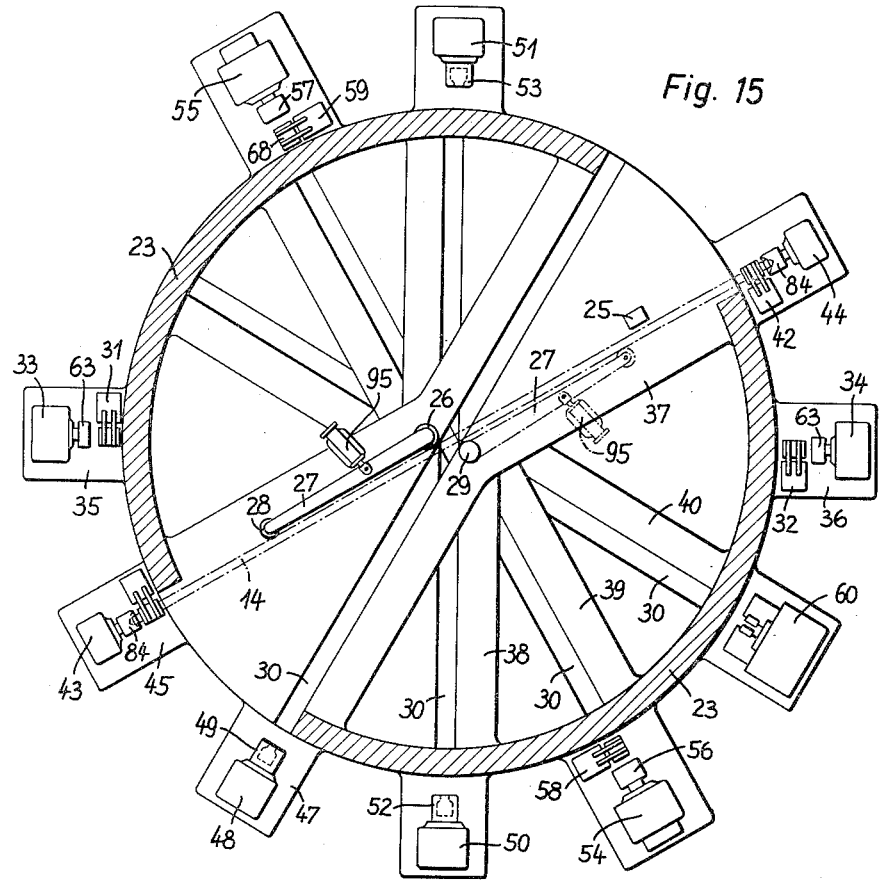
Figure 16:
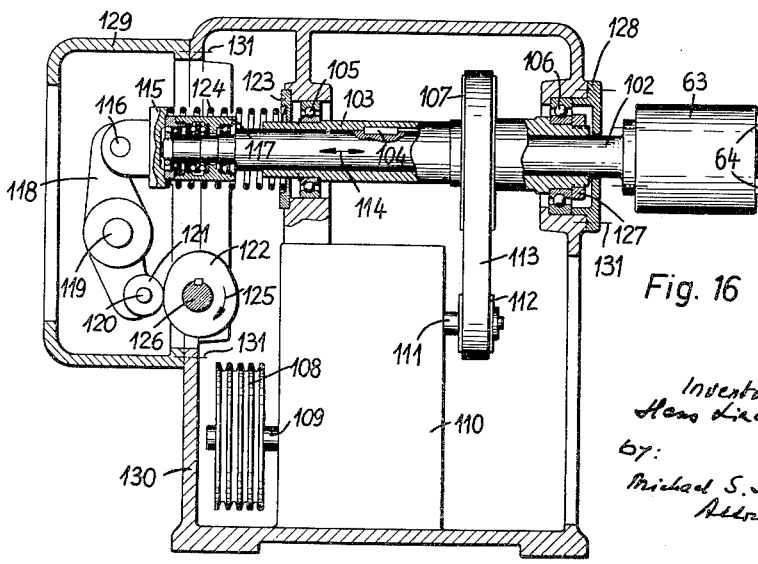

FIGURE 15 shows a cross section taken along line XV—XV of FIGURE 5 which corresponds to similar cross sections taken at lower planes closely above the other mounting plates which are disposed at an angle of 30° to each other; while FIGURE 16 shows a central vertical section taken through the housing of a machine tool, for example, a pipe-end milling machine, a thread-cutting machine, or a chamfering machine, or the like, as shown, for example, in FIGURE 6, the tool of which not only rotates about its axis but which is also movable back and forth in the axial direction.

In some of these drawings, the movements of the respective tools are indicated by arrows which are marked by reference numerals corresponding to those indicating the tools themselves but with an apostrophe added thereto.

Figure 1:
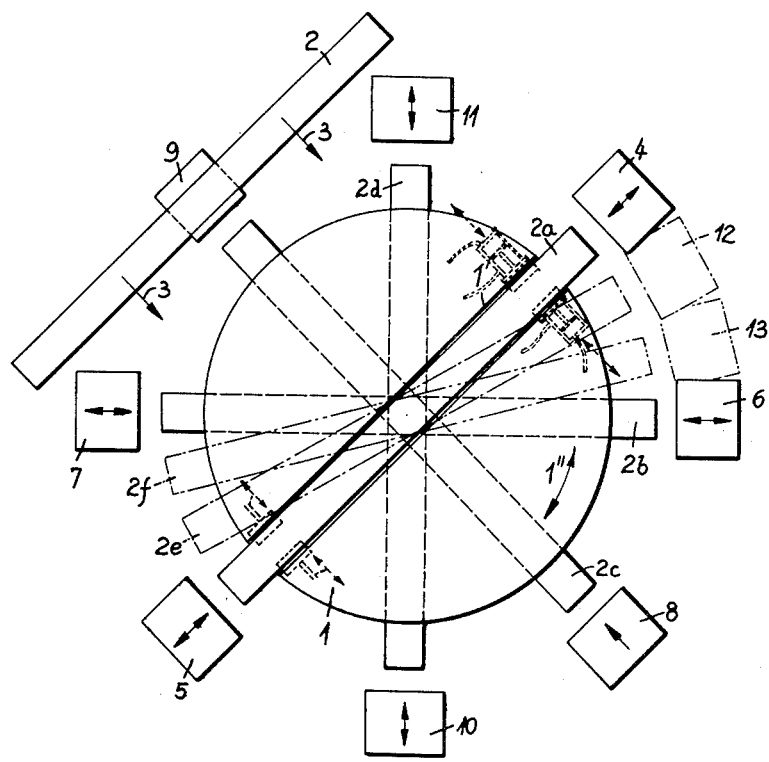
FIGURE 1 shows a diagrammatic plan view of the new conveying system with a plurality of work stations, tools, or machine tools disposed at different levels in a helically staggered relationship to each other about the substantially cylindrical conveyor and the work holding means thereon.

Referring to the drawings, and first particularly to FIGURE 1 which diagrammatically illustrates the principles of the present invention, the new conveyer essentially consists of a plurality of disks or the like 1 which are superimposed upon each other and each of which is provided with one or more guide slots or the like 1' within which the pipes are held in accordance with the positions of the respective work stations or machine tools. In FIGURE 1 it is assumed that the machine tools are movable relative to disks 1 or pipes 2, as indicated by the arrows. Pipes 2 are fed from a place of storage through suitable feed tracks, not shown in FIGURE 1, to the uppermost disk 1, as indicated by arrows 3. After a pipe 2 has been inserted into the slot or the like of this uppermost disk 1, it will be disposed in the position 2a. The means required to hold the individual pipes in a fixed position within the slots or the like, and also the means for lowering the pipes from the respective slots after being worked on are not indicated in FIGURE 1 so as not to render this illustration too confusing. Depending upon the distribution of the different work operations, either one or two pipe-end milling machines 4 or 5 of a known design may be moved toward the pipe ends. The extent of the movement of milling machines 4 and 5 may be set by adjustable stops so that each pipe after being worked on by these machines will have a predetermined length. These stops should therefore be adjusted in accordance with the desired length and then be fixed in place. It is not absolutely required to work on both ends of each pipe simultaneously in one operation, but it is also possible to work on only one pipe end at one work cycle.

The superimposed disks 1 may, as indicated by arrow 1" be turned relative to each other about a certain angle in order to feed a pipe, after being machined by one set of machine tools, to another set disposed at a lower level. If, for example, the pipe is turned from the position 2a about an angle of 45° to the position 2b and the means for holding the pipe within the slot 1' are then released, the pipe will drop down and into a slot of the next lower disk corresponding to slot 1', where it will then again be fixed in position. In the embodiment as illustrated in FIGURE 1 it is assumed that the superimposed disks 1 are associated with eight machine tools. Thus, if these machine tools are uniformly distributed along the periphery of the disks, they will be disposed at an angle of 45° relative to each other, as seen from the center of the disks. Consequently, the individual disks always have to turn about an angle of 45° to feed the pipe to the next lower disk and to the next lower set of machine tools. After being fed to the conveyer and into the position 2a and after milling off its ends, pipe 2 will therefore be moved to the position 2b in which the machine tools 6 and 7 will, for example, chamfer the pipe ends. For this purpose, machine tools 6 and 7 are likewise moved first toward and then away from the pipe ends, as indicated by the arrows. After the chamfering operation has been completed, the respective pipe will for the next operation be moved to the position 2c in which two caps 8 and 9 are fitted upon the pipe ends, whereupon a pressure medium may be filled into the pipe, for example, for carrying out a pressure test. Since the operation of fitting caps 8 and 9 upon the pipe will take approximately the same length of time as one of the other operations, two or more work cycles may be reserved for the pressure test, or the pipe may at first be flushed out and thereafter be placed under pressure, so that possibly three work cycles might have to be provided for the entire pressure test. The caps which are fitted over the pipe ends during the first or these work cycles remain thereon as long as it may be necessary to carry out the pressure test. In accordance with the number of work cycles which this period of time may require, each pipe will be conveyed through one or more subsequent disks so that in the meantime the individual preceding disks can take up the next pipes. The pipe therefore moves from the position 2c in accordance with the length of time required for the pressure test about an angle of, for example, 180° or 360° until at a suitable work station the end caps 8 and 9 will be removed. In order to facilitate the transportion of the end caps to and from the respective machines, the end caps are preferably removed at a point where above thereto, and possibly slightly staggered angularly thereto, the caps are fitted upon the pipes. Both operations of fitting the caps upon the pipe ends and removing them therefrom are preferably carried out automatically.

After the end caps have been removed from a pipe, it will at the next work cycle be moved to a point opposite to one or two thread-cutting machines 11 and 12, for example, at the position 2d. If both ends of the respective pipe have been threaded, a pipe socket may at another work station be screwed at least upon one end of the pipe by means of a socket-mounting machine of a type known as such.

In order to illustrate that the individual pipes may at each work cycle also be movable about an angle less than 45°, FIGURE 1 indicates in dot-and-dash lines further work stations 2e and 2f with machine tools 12 and 13, respectively. The lowest disk 1 or the like is finally associated with suitable conveying means for removing the finished pipe, for example, to a place of storage.

According to the second embodiment of the invention, as illustrated particularly in FIGURES 2 to 5, pipes 14 are fed along feed rods 15 to a feeding gate which consists of at least two pivotable two-armed levers 16. Each lever has two curved surfaces 17 and 18. Surface 17 carries a projection 19 which only allows one pipe at a time to pass toward and along rods 20. Surfaces 17 and 18 are adapted to slide along the ends of feed rods 15 and 20. Rods 15 and 20 are mounted by brackets 21 and 22 on the outer frame 23 or a stationary plate-like mounting element 24, respectively. Thus, each pipe 14 rolling down the incline of rods 20 first comes to lie on the uppermost mounting plate 24 and in engagement with at least two stop members 25 and 26. This constitutes the first working position of the uppermost pipe 14, as indicated by the vertical dot-and-dash lines in FIGURE 2. Stop member 25 is either pivotable by suitable means within a horizontal plane to a position above the surface of plate 24 or to a position below that surface, or it may be raised and lowered within a vertical plane. Stop member 26 as illustrated is of a cylindrical shape and also serves as a bearing for pivotably supporting a lever 27 which is adapted to pivot the respective pipe 14 by means of a roller 28 which is mounted on its free end. The means for pivoting lever 27 may consist, for example, of a piston which is connected at one end to lever 27 and is slidable within a cylinder 95. It may be operated either hydraulically or electrically. Stop member 26 is further operatively associated with a second stop member 29 which is disposed at the other side of the pipe. Mounting plate 24 is further provided with a slot 30 which intersects the vertical center of plate 24 and through which a pipe 14 may drop when turned counterclockwise by lever 27, for example, about an angle of 30° from the receiving and first working position of the pipe, as indicated in FIGURE 2 by the vertical dot-and-dash lines.

In place of or in addition to the movable stop member 25, a second lever, not shown, similar to lever 27 may be pivotably mounted on stop member 29 so as to extend substantially parallel to arm 27 and either in the same or the opposite direction thereto. Such second lever may be operated by means similar to means 95 operating lever 27 which may be mounted on plate 24 at the left side of slot 30, as seen in FIGURE 2. The two pistons in cylinders such as cylinder 95 would then be designed to operate in unison, one pushing one lever, while the other simultaneously pulls the other lever if the two levers extend in the same direction from the vertical center of plate 24, or both pistons pushing both levers equally if the levers extend in opposite directions from the center. Such double lever action insures a more positive turning movement of pipe 14 about the central vertical axis of plate 24.

Mounting plate 24 is operatively associated with two clamping mechanisms 31 and 32, the preferred construction of which is illustrated in FIGURES 6 and 7 and which is adapted to clamp pipe 14 on plate 24. Each of these clamping mechanisms cooperates with a pipe-end milling machine 33 or 34, respectively, and is mounted with such a machine on a common base 35 or 36, respectively. Underneath mounting plate 24, there are further similar mounting plates 37, 38, 39, and 40, etc. which are mounted parallel to and at a certain distance underneath each other. Each of these mounting plates is provided with a lever 27 and rollers and stops 26, 28, and 29, just as the mounting plate first described, and each of them is operatively associated with a different machine tool in accordance with the particular work to be carried out by each of these machines. Thus, for example, as illustrated in FIGURE 2, mounting plate 37 is associated with diametrically opposite clamping units 41 and 42 and chamfering machines 43 and 44, respectively. Each clamping unit is mounted on a single base 45 or 46 together with the respective chamfering machine. The next lower mounting plate 37 is, in turn, associated with an apparatus 48 for flushing the pipes which is mounted on a base 47 and by means of which a cap 49, as illustrated more specifically in FIGURE 9, may be slipped over one end of a pipe which is to be flushed for cleaning it at the inside. The next lower mounting plate 39 is associated at each side with an apparatus 50 and 51 for attaching caps 52 and 53 to both ends of the pipe and for subjecting the pipe to a pressure test. As illustrated in FIGURE 10, caps 52 and 53 are of a construction similar to cap 49 and they are likewise fitted upon the pipe ends by being moved in the longitudinal direction of the respective pipe to be tested. At the next work station, thread-cutting machines 54 and 55 with clamping mechanisms 58 and 59, respectively are mounted at opposite sides to cooperate with the next lower slotted mounting plate 40 for cutting screw threads upon both pipe ends, while at the next work station in cooperation with the next lower mounting plate, not shown, a pipe-socket mounting machine 60 is mounted at only one side for screwing a pipe socket upon one end of the respective pipe. Finally, after the pipe has again been turned on this last mounting plate about an angle of 30° and has thus arrived within a vertical plane underneath its first working position, it is removed by means of rollers 61, as indicated in FIGURE 2, which withdraw the pipe in a direction at a right angle to the direction in which it was fed toward the first mounting plate 24.

Consequently, each pipe, after it has been worked on in one particular work station on the respective mounting plate is turned at a certain angle, for example, 30°, about the central vertical axis of the compound machine and then dropped through slot 30 in such mounting plate upon the next lower mounting plate where it is again worked on and then turned and dropped through the slot in that plate upon the next lower mounting plate, and so forth until all operations on the pipe have been completed and the pipe is to be removed by the rollers 61 through the lower end of the zigzag-shaped slots 62 in frame 23.

As illustrated in FIGURE 6, each pipe-end milling machine 33 and 34 has an axially movable head 63 with cutters 64. For milling off the end of pipe 14 to obtain an accurately level end surface, head 63 is moved in the direction shown by arrow 65, for example, until it engages with an adjustable stop 66 which may be mounted on the housing of the adjacent clamping mechanism 31 or 32, respectively. As soon as head 63 engages with stop 66, the milling operation will be completed and the head may be returned to its original position.

As shown particularly in FIGURE 16, head 63 carrying cutters 64 is mounted on a shaft 102 which is slidable in the axial direction in a tubular sleeve 103, but is able to rotate together with sleeve 103 by being connected to the latter by a key 104. Shaft 102 and sleeve 103 are rotatably mounted in bearings 105 and 106 and carries a pulley 107 which is driven by an electric motor, not shown, through an infinitely variable transmission 110, the driven shaft 111 of which carries a pulley 112 which is connected by a belt 113 to pulley 107 and thus drives sleeve 103 and thus also the cutter head 63 at a variable speed.

In order to attain a reciprocatory movement of shaft 102, as indicated in FIGURE 16 by the arrow 104, the end of shaft 102 facing in the direction opposite to cutter head 63 is mounted within a socket 117 which has a flange 115 and a bearing 116 at its outer end on which a two-armed lever 118 is mounted which is pivotable about a shaft 119. Socket 117 is connected to shaft 102 so as to permit the shaft to rotate, even though socket 117 can only carry out a reciprocatory linear movement in which, however, socket 117 will take along shaft 102. The other end of lever 118 carries a roller 121 which is freely rotatable on a shaft 120. This roller 121 engages with the peripheral surface of a cam disk 122 by the provision of one or more springs 124 between a disk 123 covering bearing 105 and flange 115 on socket 117. Cam disk 122 is rotated in the direction indicated by the arrow 125, preferably by a separate motor, now shown, through a shaft 126.

Sleeve 103 is prevented from sliding in the axial direction by means of a nut 127, which is mounted on the end thereof, and by a bearing cover 128 holding bearing 106 in a fixed position and secured to housing 130 of the milling machine by bolts 131 as indicated by dot-and-dash lines.

Each of the clamping mechanisms 31, 32, 41, 42, 58, 59, etc. consists of two clamping jaws 67 and 68 as illustrated in FIGURE 7, which are secured to arms 70 and 71, respectively, which are pivotable about a common shaft 69. Clamping jaw 67 is acted upon by a cam 73 which is secured to a shaft 72 which is rotatably mounted within the outer housing. Thus, by a rotation of cam 73, clamping jaw 67 will be moved either upwardly or downwardly. As long as the series of pipes which is to be worked on remains of the same diameter, the position of cam 73, after having been once adjusted, may remain unchanged.

For clamping a pipe between jaws 67 and 68, arm 70 must first be pivoted upwardly to the position, as indicated in FIGURE 7 in dot-and-dash lines, so that the pipe can be lowered from above upon clamping jaw 67. For attaining such pivotal movement of arm 70, the same is pivotably connected to a link 74 which, in turn, is pivotably connected to one end of two further links 76 and 77. The other end of link 76 is pivotably mounted on a stationary part of the housing, while the other end of link 77 is pivotably mounted at 79 on a rotatable disk 80 which may be rotated by a shaft 81. Depending upon the position of bearing 79, the clamping jaws 67 and 68 will either be opened to admit a new pipe or allow it to be removed, or it will be closed to clamp the pipe.

FIGURE 8 diagrammatically shows a chamfering tool of a chamfering machine 43 or 44. One or more cutters 82 and one or more cutters 83 are mounted on a head 84 which may be rotated by a shaft 85. Since cutters 82 are adapted to chamfer the inner edge, while cutters 83 are adapted at the same time to chamfer the outer edge of the pipe, both edges of each pipe end are chamfered simultaneously.

End caps 49, 52, and 53, as illustrated in FIGURES 9 and 10, serve as means for connecting a supply line 86 to the partly finished pipe 14. They contain at least one sealing ring 87 whch is adapted to be pushed over the respective pipe end to seal the same toward the outside. When end cap 49 as shown in FIGURE 9 is fitted over the pipe end, a suitable liquid, for example, water, may be passed into one end of pipe 14 by means of the flushing apparatus 48 and be discharged from the other end of the pipe in the direction as indicated in FIGURE 2 by arrow 88. The end cap 52 or 53 according to FIGURE 10 is substantially similar to the one shown in FIGURE 9. One of these caps is fitted over each end of a pipe 14 for testing its tightness by supplying a pressure medium, such as water, oil, or the like by means of the apparatus 50 and 51 to the inside of the pipe. After the pressure test has been completed, end caps 52 and 53 are withdrawn from the respective pipe so that the latter may then be fed to the thread-cutting machines 54 and 55 with threading dies 56 and 57, respectively. The simplest form of such a threading die may consist of a die head, the dies 89 and an internally conical sleeve part 90 which is movable in the axial direction.

If both ends of a pipe have been provided with screw threads, a pipe socket 91 may be screwed upon at least one end of each pipe by supplying the pipe socket by means of a press die 92 to a plurality of driven rollers 93 which rotate the socket and thereby screw the same upon the screw threads on the pipe end. Rollers 93 may be driven, for example, by means of flexible shafts 94.

The compound machine, as illustrated in FIGURES 2 to 12b operates as follows:

Pipes 14 resting on feed rods 15 are supplied individually at regular intervals along feed rods 20 to a mounting plate 24 by rocking pawls 16 back and forth. They are then clamped by the clamping mechanisms 31 and 32 and milled at their ends by a movement of cutter heads 63 toward these ends. After the pipe ends have been milled off straight, the clamping means are released, stop 25 is lowered, and arm 27 is pivoted in the direction shown by arrow 96 by means of the piston which is slidable within cylinder 95. Pipe 14 is thereby turned between stops 26 and 29 about an angle of 30° so as to coincide with slot 30 through which it then drops by its own weight to come to rest on the next lower mounting plate 37 and in a position facing toward the next machine tools 43 and 44. After clamping the pipe by means of clamping mechanism 41 and 42, the two pipe ends are then chamfered, whereupon the clamping means are released and the pipe is turned again about an angle of 30° by an arm corresponding to arm 27. The operation then proceeds as above described until the pipe is withdrawn by rollers 61.

It will be understood from the drawings and the above description that as soon as arm 27 in cooperation with stops 26 and 29 on any of the mounting plates has turned a pipe 14 sufficiently to drop the same through slot 30 in such plate, arm 27 will return to its original position to receive and then turn the next pipe. Consequently, none of the elements of the compound machine will ever be idle and the pipes will be fed to the machine, conveyed or worked on within the machine, or withdrawn from the machine in a continuous order of succession.

FIGURES 4 and 5 illustrate the individual work stations more clearly, especially in their coordination to slots 62 in frame 23.

Figure 13:
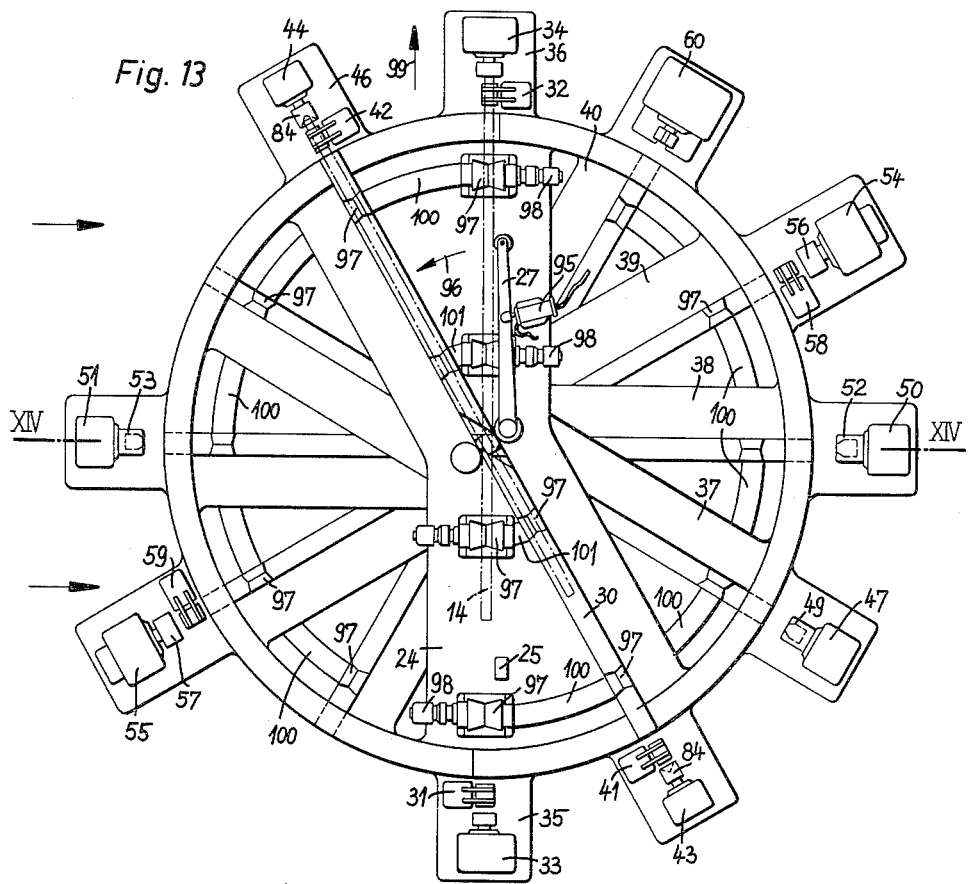
FIGURE 13 shows a plan view of a compound machine similarly as illustrated in FIGURES 2 and 4 for working on pipes of different lengths, and therefore provided with conveying rollers for shifting the pipes in the longitudinal direction thereof within the conveyer.
Figure 14:
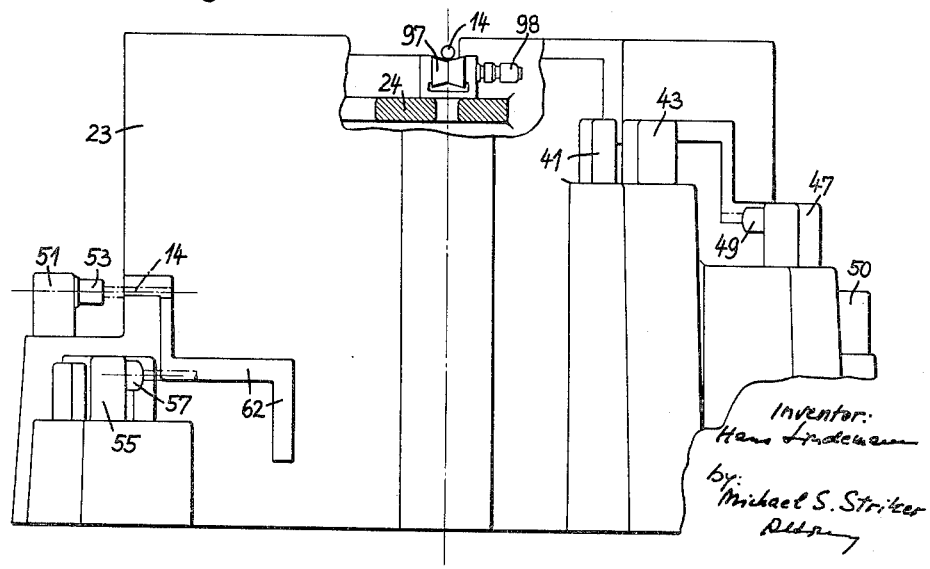
FIGURE 14 shows a side view of the compound machine according to FIGURE 13, partly in a cross section taken along line XIV—XIV of FIGURE 13.

While in the embodiment according to the invention, as illustrated in FIGURES 1 to 5, the pipes to be worked on are of substantially equal lengths, it is assumed in the next embodiment, as illustrated in FIGURES 13 and 14, that the pipes as they are supplied to the compound machine are of different lengths. Consequently, it would be impractical to move the machine tools and parts thereof in the direction toward the pipes, but it would be more advisable to feed the pipes toward the machine tools.

Therefore, each machine tool or each opposite pair of machine tools is associated with a plurality of conveying rollers 97. As distinguished from the two embodiments previously described, a pipe 14, after rolling off feed rods 20, not shown in FIGURES 13 and 14, comes to rest upon rollers 97 and is thereby fed first toward the milling machine 34. Each of these rollers 97 is of a double-conical shape and driven by a motor 98, the direction of rotation of which may be reversed. Thus, for example, pipe 14 is first moved in the direction shown by arrow 99. After this end of the pipe has been milled straight, motors 98 are reversed so that rollers 97 will then move the pipe toward milling machine 33. After the other end of the pipe has also been milled off straight, pipe 14 will be turned by arm 27 and then drop through the slot 30 and upon rollers 97 of the next lower mounting plate, where it is again fed first to one chamfering machine, for example, machine 44, and then to the other, 44. If the pipes are of a shorter length than the distance between the pressure-testing apparatus 50 and 51, one or both pressure heads may be extendable toward, and if necessary even to a certain extent into frame 23. Finally, the finished pipe which is provided with a pipe socket is withdrawn in the direction shown by arrow 99, but at a lower level than the one on which it was originally fed toward the uppermost rollers 97. Since in the embodiment according to FIGURES 13 and 14 the pipes rest on rollers 97 rather than directly on the mounting plates 24, 37, 38, 39, etc., outer and inner guide surfaces 100 and 101 are preferably provided adjacent to rollers 97 along which the pipes may slide while being turned toward slots 30.

Although my invention has been illustrated and described with reference to its preferred application to a pipe finishing and testing machine, I wish to have it understood that it is in no way limited to such a machine or to the details thereof, but that its basic concept of conveying pipes, rods, or any other elongated objects by swiveling them about an axis extending vertically to their own axis and by intermittently moving them in a downward direction from one work station to another which are disposed at different levels and in a stepwise helical arrangement relative to each other about the periphery of the conveyer, may be applied for numerous other purposes, for example, for assembly lines and the like.

What I claim is:

1. A method of conveying articles from one to another of a plurality of tool stations located at different horizontal levels in angularly spaced vertical planes, respectively, comprising the steps of placing each article successively in a horizontal plane opposite a tool station; performing at said tool station an operation on said articles; turning said article in a horizontal plane about a vertical axis through an angle corresponding to the angular distance between said tool station and another tool station, and moving said article in vertical direction to a horizontal plane at the level of said other tool station; and performing at said other tool station another operation on said article.

2. A method of conveying articles from one to another of a plurality of tool stations located at different horizontal levels in angularly spaced vertical planes, respectively, comprising the steps of placing each article successively on a horizontal support opposite a tool station; performing at said tool station an operation on said article; turning said article in a horizontal plane on said support about a vertical axis through an angle corresponding to the angular distance between said tool station and another tool station, and moving said article in vertical direction over an edge of said support to a horizontal support at the level of said other tool station; and performing at said other tool station another operation on said article.

3. A method of conveying articles from one to another of a plurality of tool stations located at different horizontal levels in angularly spaced vertical planes, respectively, comprising the steps of placing each article successively on a support opposite a tool station; performing at said tool station an operation on said article; turning said support with said article in a horizontal plane about a vertical axis through an angle corresponding to the angular distance between said tool station and another tool station, and moving said article in vertical direction to a support at the level of said other tool station; and performing at said other tool station another operation on said article.

4. A method of conveying elongated articles from one to another of a plurality of tool stations located at different horizontal levels in angularly spaced vertical planes, respectively, comprising the steps of placing each article successively on a circular support opposite a tool station located at the periphery of said support; performing at said tool station an operation on said article; turning said support with said article in a horizontal plane about a vertical axis equidistant from at least one end of the same and from said work stations through an angle corresponding to the angular distance between said tool station and another tool station, and moving said article in vertical direction through a slot in said support to a support at the level of said other tool station; and performing at said other tool station another operation on said article.

5. A method of conveying articles from one to another of a plurality of tool stations located at different horizontal levels in angularly spaced vertical planes, respectively, comprising the steps of placing each article successively on a horizontal support opposite a tool station; securing said article to said support; performing at said tool station an operation on said article; releasing said article; turning said article in a horizontal plane on said support about a vertical axis through an angle corresponding to the angular distance between said tool station and another tool station, and moving said article in vertical direction through a slot of said support to a horizontal support at the level of said other tool station; and performing at said other tool station another operation on said article.

6. A method of conveying elongated articles from one to another of a plurality of tool stations located at different horizontal levels in angularly spaced vertical planes, respectively, comprising the steps of placing each article successively on a support opposite and between a pair of diametrically opposite tool stations; performing at one of said tool stations an operation at one end of said article; shifting said article in a longitudinal direction thereof toward the other tool station of said pair of tool stations; performing at said other tool station an operation at the other end of said article; turning said article in a horizontal plane about a vertical axis equidistant from at least one end of the same and from said tool stations through an angle corresponding to the angular distance between said tool station and another tool station, and moving said article in vertical direction to a support at the level of said other tool station; and performing at said other tool station another operation on said article.

7. A method of conveying articles from one to another of a plurality of tool stations arranged along a circular arc of over 180° and located at different horizontal levels in angularly spaced vertical planes, respectively, comprising the steps of placing each article successively on a support opposite a tool station; performing at said tool station an operation on said article; turning said article in a horizontal plane about a vertical axis equidistant from at least one end of the same and from said tool stations through an angle corresponding to the angular distance between said tool station and another tool station, and moving said article in vertical direction to a support at the level of said other tool station; performing at said other station another operation on said article; turning said article and moving said article in vertical direction; performing operations on said article in each turned and vertically displaced position thereof at said tool stations; and removing said article after an operation at the last tool station and after said article has been turned over 180° out of its initial position.

References Cited in the file of this patent

UNITED STATES PATENTS

| | | |
|---|---|---|
| 1,067,045 | De Lummen | July 8, 1913 |
| 1,524,067 | Troutman | Jan. 27, 1925 |
| 2,353,638 | Beaulieu | July 18, 1944 |
| 2,514,104 | Sutherland | July 4, 1950 |
| 2,704,162 | Johnson | Mar. 15, 1955 |
| 2,730,251 | Schutt | Jan. 10, 1956 |